United States Patent [19]
Iwase

[11] Patent Number: 5,743,239
[45] Date of Patent: Apr. 28, 1998

[54] FUEL PUMP CONTROL SYSTEM FOR VEHICLE

[75] Inventor: Tsutomu Iwase, Gunma-Ken, Japan

[73] Assignee: Fuji Jukogyo Kabushiki Kaisha, Tokyo, Japan

[21] Appl. No.: 864,886

[22] Filed: May 29, 1997

[30] Foreign Application Priority Data

Jun. 7, 1996 [JP] Japan .................................. 8-168375

[51] Int. Cl.$^6$ .................................................. F02M 37/04
[52] U.S. Cl. ............... 123/514; 123/509; 123/497; 417/80; 137/574
[58] Field of Search .................... 123/514, 497, 123/509, 510, 456; 137/392, 574; 417/79, 80, 88

[56] References Cited

U.S. PATENT DOCUMENTS

| | | | |
|---|---|---|---|
| 2,953,156 | 9/1960 | Bryant | 417/79 |
| 3,810,714 | 5/1974 | Turner | 417/80 |
| 4,703,771 | 5/1987 | Mimura | 137/574 |
| 4,834,132 | 5/1989 | Sasaki | 123/514 |
| 4,928,657 | 5/1990 | Asselin | 123/509 |
| 5,040,516 | 8/1991 | Haraguchi | 123/514 |
| 5,197,444 | 3/1993 | Lang | 123/514 |
| 5,396,872 | 3/1995 | Rüger | 137/574 |
| 5,546,920 | 8/1996 | Johansson | 123/514 |

*Primary Examiner*—Carl S. Miller
*Attorney, Agent, or Firm*—Beveridge, DeGrandi, Weilacher & Young, L.L.P.

[57] ABSTRACT

In a fuel supply system for a vehicle, provided with a fuel tank having a bottom wall having an upward convex portion dividing an interior space of the fuel tank into a first chamber and a second chamber, a discharge rate of an electric fuel pump is controlled properly to reduce power consumption and fuel consumption. A fuel level monitoring means compares an output $D_m$ of a fuel meter unit 13 representing a level of fuel in the fuel tank with a set threshold fuel level $L_j$, i.e., a minimum fuel level that requires the operation of a jet pump which pumps fuel from the second chamber into the first chamber. A power supply control means controls power supply to the fuel pump to supply power necessary for driving the fuel pump for operation at a discharge rate equal to the sum of the fuel consumption of the engine and a minimum required flow rate necessary for maintaining the performance of the fuel supply system when $D_m \geq L_j$, or for operation at a maximum discharge rate when $D_m < L_j$.

8 Claims, 5 Drawing Sheets

FUEL PUMP CONTROL SYSTEM FOR VEHICLE

BACKGROUND OF THE INVENTION

1. Field of the Invention

The present invention relates to a controller for controlling a vehicle fuel pump.

2. Description of the Related Art

A fuel feed system which supplies fuel to an fuel injection valve of a vehicle engine provides an electric fuel pump to deliver fuel from a fuel tank to the fuel injection valve. The pressure of the fuel delivered from the fuel tank through a delivery line by the fuel pump is regulated at a predetermined pressure by a pressure regulating valve, and the fuel is injected into an intake pipe of the engine while the fuel injection valve is open. Surplus fuel is returned through a return line connected to a drain port of the pressure regulating valve into the fuel tank.

A technique for reducing the load on the fuel pump of such a fuel feed system, proposed in JP-A No. 6-147047 controls the discharge of the fuel pump according to the operating conditions of the engine, another technique for the same purpose, proposed in JP-U No. 6-43259 controls the power supply to the fuel pump so that the flow rate of returned fuel corresponds with a desired flow rate of the returned fuel.

Referring to FIG. 1, in a four-wheel drive automobile, a rear differential underlies a fuel tank 1. Therefore, a bottom wall of the fuel tank 1 is formed in an upward convex shape so as to straddle the differential. Consequently, an interior space of the fuel tank 1 is divided into first and second chambers. A fuel pump 2 pumps fuel from any one of the first and the second chamber, the first chamber in this example, and feeds fuel through a delivery line 4. Return fuel is returned through a return line 8 connected to the delivery line 4 into the fuel tank 1. A jet pump 11 is disposed in the first chamber to pump fuel from the second chamber into the first chamber in order that fuel may not be left unused in the second chamber. Since the jet pump 11 of such a fuel tank is driven by the return fuel, it is difficult to improve fuel consumption by directly applying the foregoing prior art techniques which optimize the discharge by reducing the quantity of return fuel.

SUMMARY OF THE INVENTION

Accordingly, it is an object of the present invention to provide a controller for controlling a fuel pump included in a fuel feed system for a vehicle, capable of solving the foregoing problems in the prior art.

The present invention provides a fuel pump controller for controlling a fuel pump in a fuel feed system for a vehicle, provided with a fuel tank having a bottom wall having an upwardly projecting portion dividing an interior space of the fuel tank into a first chamber and a second chamber, an electric fuel pump for pumping fuel from the first chamber into a delivery line, and a jet pump to be operated by return fuel returned through a return line connected to the delivery line into the fuel tank to suck fuel from the second chamber into the first chamber. The fuel pump controller for controlling the fuel pump comprises a fuel meter unit for detecting a level of fuel in the fuel tank, fuel level monitoring means for comparing the level of fuel in the fuel tank with a set threshold fuel level, and power supply control means for controlling a power supply to the fuel pump according to a signal from said fuel level monitoring means.

The fuel pump controller optimizes the discharge of the fuel pump, reduces the power consumption of the fuel pump and improves fuel consumption through the reduction of load on an alternator resulting from the reduction of the power consumption of the fuel pump without entailing a problem of fuel being left unused in the second chamber of the fuel tank.

The fuel pump controller also prevents the fuel temperature from rising, and solves a problem such as evaporation or odor, resulting from the reduction of calorific power through the reduction of the power consumption of the fuel pump and the reduction of pressure in a fuel line through the reduction of the discharge of the fuel pump.

Preferred embodiments of the present invention will become understood from the following detailed description referring to the accompanying drawings.

DETAILED DESCRIPTION OF THE PREFERRED EMBODIMENTS

Figure 1:
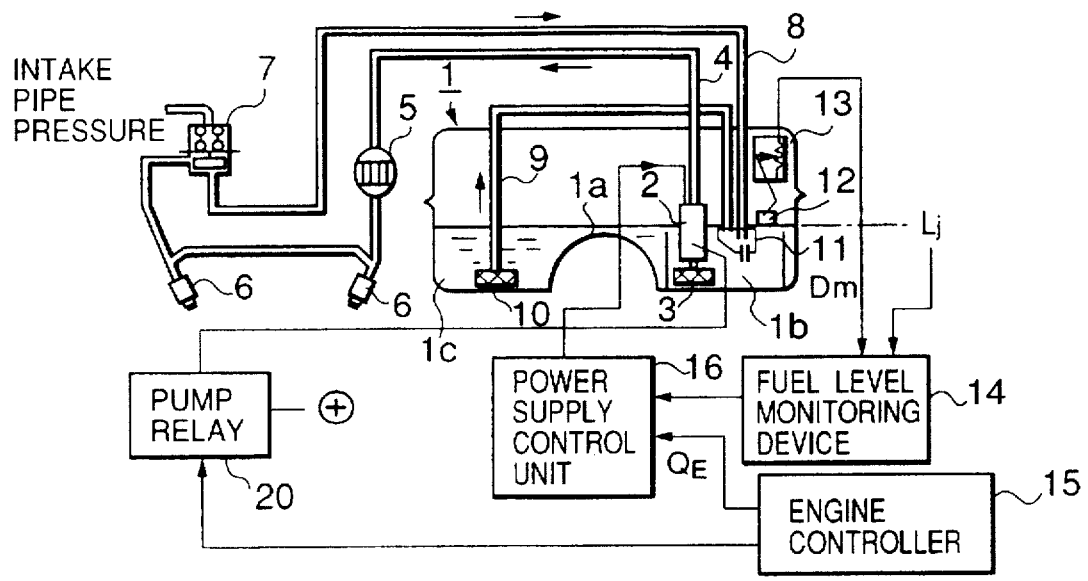
FIG. 1 is a diagrammatic view of a vehicle fuel feed system to which the present invention is applied.

Referring to FIG. 1 showing a vehicle fuel feed system, the vehicle fuel feed system comprises a fuel tank 1, an electric fuel pump 2, a fuel filter 3, a delivery line 4, a fuel filter 5, fuel injection valves 6, a pressure regulating valve 7, a return line 8, and a fuel pump controller in a first embodiment according to the present invention comprising a fuel level monitoring device 14 and a power supply control unit 16.

The fuel tank 1 has a bottom wall having a protrusion 1a of an upward convex shape formed in a substantially central portion thereof and dividing a lower portion of an interior space of the fuel tank 1 into a first chamber 1b and a second chamber 1c. The fuel pump 2 is disposed in the first chamber 1b to pump fuel from the bottom of the first chamber 1b through the fuel filter 3 into the delivery line 4 by pressure. Fuel pumped into the delivery line 4 flows through the fuel filter 5 into the fuel injection valves 6. The pressure regulating valve regulates the pressure of fuel in the delivery line 4 at an optimum injection pressure, and returns surplus fuel through the return line 8 connected to the delivery line 4 into the first chamber 1b. A jet pump 11 disposed in the first chamber 1b of the fuel tank 1 is connected to the outlet end of the return line 8. When the return fuel flows through the jet pump 11, the jet pump 11 sucks fuel through a fuel filter 10 and a suction line 9 from the second chamber 1c and delivers fuel to the first chamber 1b. A fuel meter unit 13 detects a level of fuel in the fuel tank 1 by means of a float 12 and provides a level signal corresponding to a measured level of fuel in the fuel tank 1.

The protrusion $1a$ of the fuel tank 1 is formed substantially in the central portion of the bottom wall of the fuel tank 1 because four-wheel drive vehicles (4WD vehicles) and front engine rear drive vehicles (FR vehicles) need a space for accommodating a rear differential and a propeller shaft under a substantially central portion of a bottom wall of a fuel tank.

In the vehicle fuel feed system having the fuel tank 1 in which the first chamber $1b$ and the second chamber $1c$ are formed by dividing the lower portion of the interior space of the fuel tank 1 by the protrusion $1a$, and constructed to feed fuel from the first chamber $1b$ to the delivery line 4 by the fuel pump 2 and to transfer fuel by suction from the second chamber $1c$ to the first chamber $1b$ by the jet pump 11, a threshold fuel level $L_j$, i.e., a lower limit level of fuel in the fuel tank 1 requiring the operation of the jet pump 11 in order that fuel may not be left unused in the second chamber $1c$ of the fuel tank 1, is set. The fuel level monitoring device 14 decides whether or not the jet pump 11 needs to be operated on the basis of the relation between the threshold fuel level $L_j$ and the output $D_m$ of the fuel meter unit 13, while the power supply control unit 16 controls the power supply to the fuel pump 2 according to a signal from the fuel level monitoring device 14. The threshold fuel level $L_j$ is equal to the height of the protrusion $1a$ or a level in the range of $\pm L$ mm on the basis of the height of the protrusion $1a$.

Figure 2:
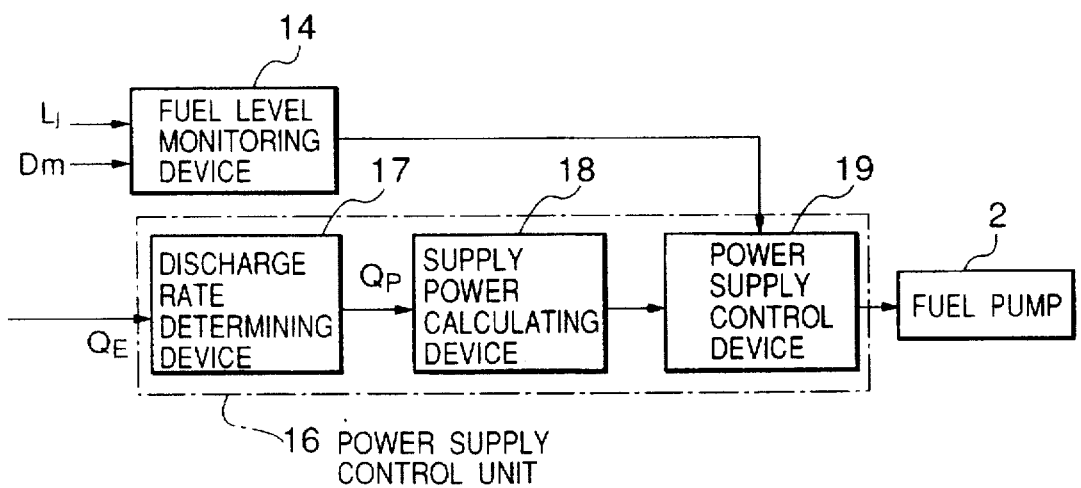
FIG. 2 is a block diagram of a fuel pump controller in a first embodiment according to the present invention.

Referring to FIG. 2, the power supply control unit 16 is provided with a discharge rate determining device 17, a supply power calculating device 18, and a power supply control device 19. The discharge rate determining device 17 determines a required fuel discharge rate $Q_P$ to be discharged by the fuel pump 2 on the basis of a signal indicating a fuel consumption rate $Q_E$ at which an engine consumes fuel, provided by an engine controller 15. The supply power calculating device 18 calculates a magnitude of power to be supplied to the fuel pump 2 to enable the fuel pump 2 to discharge fuel at the required fuel discharge rate $Q_P$ determined by the discharge rate determining device 17, and gives the calculated magnitude of power to the power supply control device 19. The power supply control device 19 selects either one of the magnitude of power calculated by the power calculating device 18 and a predetermined magnitude of power on the basis of a signal given thereto by the fuel level monitoring device 14.

Figure 3:
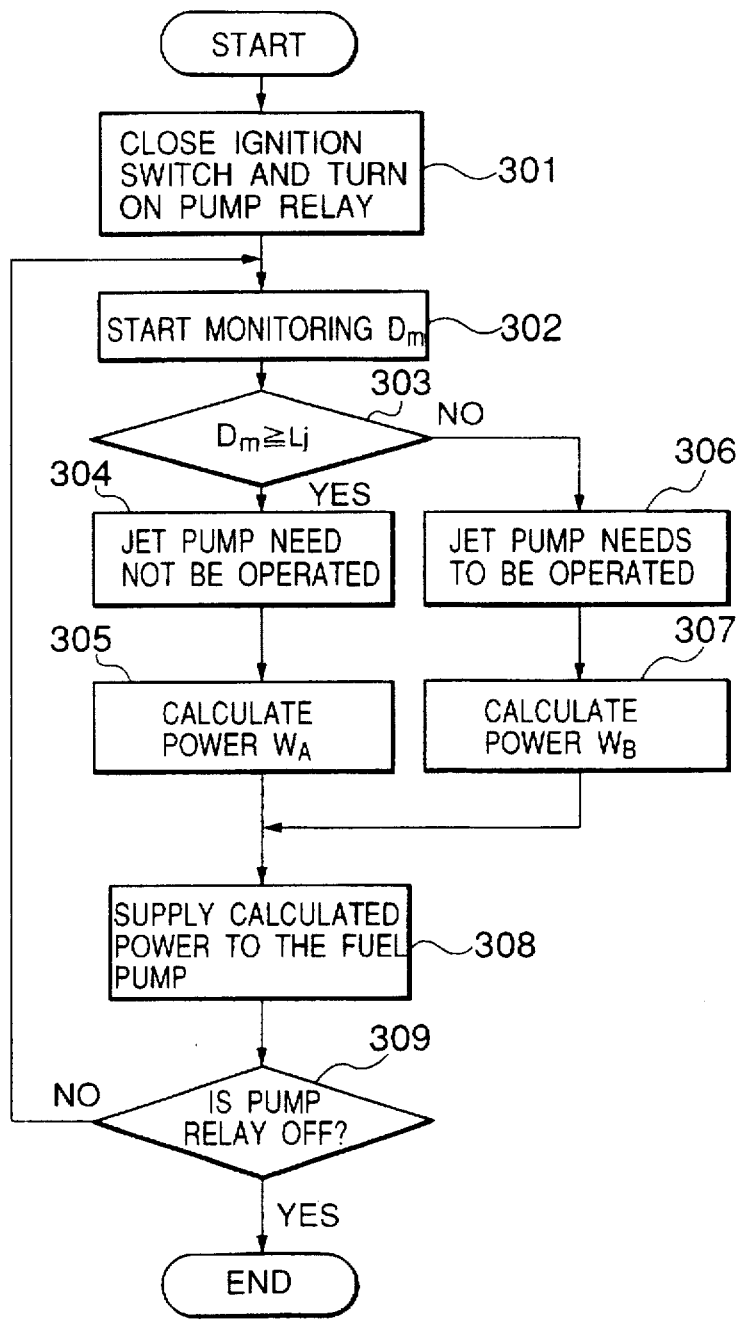
FIG. 3 is a flow chart of a control operation to be carried out by the fuel pump controller of FIG. 2.

The control operation of the fuel pump controller including the fuel level monitoring device 14 and the power supply control unit 16 will be described with reference to a flow chart shown in FIG. 3.

When an ignition switch is closed, the engine controller 15 provides an output signal to turn on a pump relay 20 to start driving the fuel pump 2 (Step 301), and the fuel level monitoring device 14 starts a monitoring operation for monitoring the output $D_m$ of the fuel meter unit 13 (Step 302) and comparing the output $D_m$ with the threshold fuel level $L_j$(Step 303). If $D_m \geq L_j$, the fuel level monitoring device 14 decides that the jet pump 11 need not be operated and gives a signal to that effect to the power supply control device 19 (Steps 304 and 305), and then the power supply control device 19 controls to supply an optimum power $W_A$ calculated by the supply power calculating device 18, i.e., a necessary power to make the fuel pump 2 to discharge the fuel at the required fuel discharge rate $Q_P$ determined by the discharge rate determining device 17, to the fuel pump 2 (Step 308).

The required fuel discharge rate $Q_P$ is expressed by:

$$Q_P = Q_E + Q_O$$

where $Q_E$ is a fuel consumption rate of the engine and $Q_O$ is a minimum required fuel discharge rate. The fuel consumption rate $Q_E$ of the engine is calculated by using a fuel injection duty factor, and the duty factor is calculated by using a correction map showing the relation between a basic fuel injection quantity, intake air quantity and engine speed, a signal provided by an $O_2$ sensor, and an acceleration correction and such by the engine controller 15. The minimum required fuel discharge rate $Q_O$ is a minimum necessary fuel discharge rate high enough to return some quantity of fuel discharged by the fuel pump 2 through the return line 8 to ensure the satisfactory performance of the pressure regulating valve 7 which regulates the pressure in the delivery line 4. Concretely, the minimum required fuel discharge rate $Q_O$ is, for example, on the order of 5 1/hr.

If $D_m < L_j$, the fuel level monitoring device 14 decides that the jet pump 11 needs to be operated and gives a signal to that effect to the power supply control device 19 (Steps 306 and 307). Then, the power supply control device 19 changes the power $W_A$ calculated by the supply power calculating device 18 for a predetermined power $W_B$ higher than the power $W_A$ (Step 308).

The power supply control device 19 uses a conventional power supply controller which controls the duty factor of the power supplied to the fuel pump 2, or a resistor for changing power to be supplied to the fuel pump 2. The power supply control operation of the power supply control device 19 employing resistors will be described with reference to FIG. 4.

Figure 4:
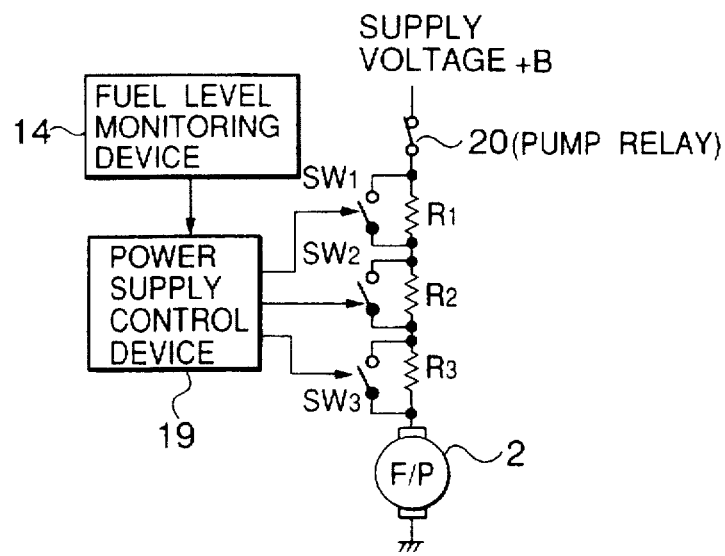
FIG. 4 is a circuit diagram of a power supply control unit for controlling power supply to a fuel pump.

Referring to FIG. 4, resistors $R_1$, $R_2$ and $R_3$ are connected in series to a drive circuit of the fuel pump 2, and bypass circuits respectively provided with switches $SW_1$, $SW_2$ and $SW_3$ are connected to the resistors $R_1$, $R_2$ and $R_3$, respectively. The power supply control device 19 closes and opens the switches $SW_1$, $SW_2$ and $SW_3$ selectively on the basis of the outputs of the supply power calculating device 18 and the fuel level monitoring device 14 to control the power supplied to the fuel pump 2. The power $W_A$ to be supplied to the fuel pump 2 when the jet pump 11 need not be operated is set by opening at least one of the switches $SW_1$, $SW_2$ and $SW_3$, and the power $W_B$ to be supplied to the fuel pump 2 when the jet pump 11 needs to be operated is set by closing all the switches $SW_1$, $SW_2$ and $SW_3$ so that a supply voltage +B is applied to the fuel pump 2 to make the fuel pump 2 operate at a maximum discharge rate $Q_{max}$.

In the example shown in FIG. 4, the power $W_A$ to be supplied to the fuel pump 2 when the jet pump 11 need not be operated is changed in a plurality of steps according to the required fuel discharge rate $Q_P$ by properly controlling the switches $SW_1$, $SW_2$ and $SW_3$. However, the drive circuit of the fuel pump 2 may be connected to one resistor, and one bypass circuit provided with a switch are connected to the resistor. In this example, the power $W_A$ sufficient to drive the fuel pump 2 for operation at the required fuel discharge rate $Q_P$ by opening the switch, may be supplied, when it is decided that the jet pump 11 need not be operated, and the power $W_B$ sufficient to drive the fuel pump 2 for operation at a fuel discharge rate equal to the sum of the required fuel discharge rate $Q_P$ and a fuel discharge rate necessary to return the fuel at a flow rate necessary for driving the jet pump 11, by closing the switch, may be supplied, when it is decided that the jet pump 11 needs to be operated.

As described above, the threshold fuel level $L_j$, i.e., a lower limit level of the fuel in the fuel tank 1 requiring to operate the jet pump 11 in order that fuel may not be left unused in the second chamber $1c$ of the fuel tank 1, is set, and the fuel level monitoring device 14 monitors the fuel level in the fuel tank 1 to see whether or not the fuel level is lower than the threshold fuel level $L_j$, and the power supplied to the fuel pump 1 is controlled according to the output of the fuel level monitoring device 14 so that the fuel is returned to the fuel tank 2 at a minimum flow rate while the jet pump need not be operated. Therefore, it is possible to achieve the significant reduction of the power consumption without entailing a problem of the fuel being left unused in the second chamber 1c of the fuel tank and the consequent improvement of the fuel consumption through the reduction of the load on an alternator.

Figure 5:
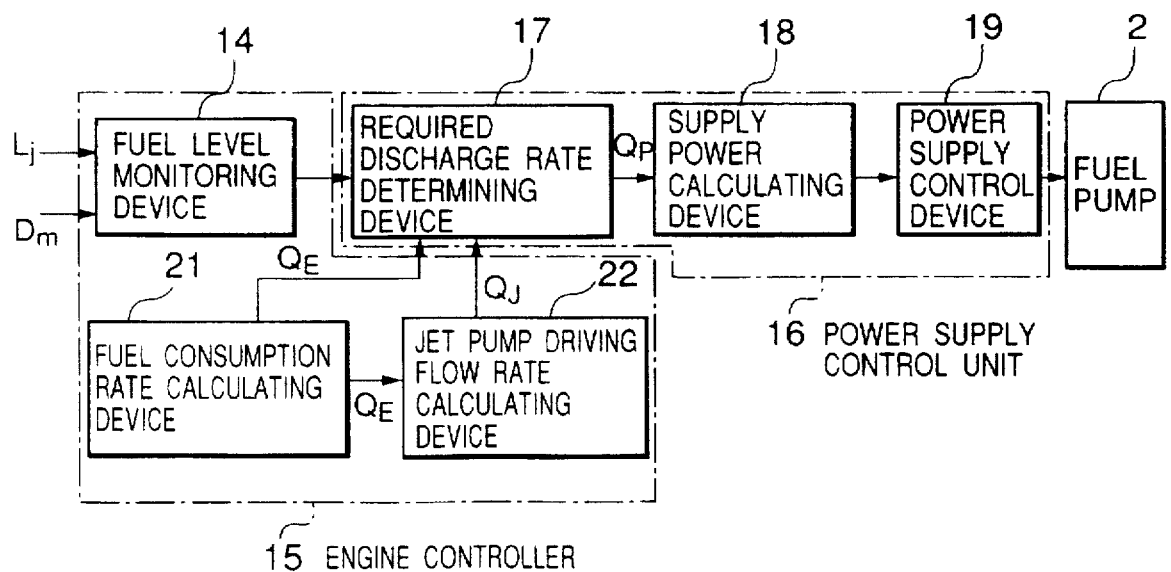
FIG. 5 is a block diagram of a fuel pump controller in a second embodiment according to the present invention.

Referring to FIG. 5, a fuel pump controller in a second embodiment according to the present invention for controlling the power to be supplied to a fuel pump 2 comprises an engine controller 15 and a power supply control unit 16. The engine controller 15 has a fuel level monitoring device 14, a fuel consumption rate calculating device 21 and a jet pump driving flow rate calculating device 22. The power supply control unit 16 has a discharge rate determining device 17, a supply power calculating device 18 and a supply power control device 19. It is noted that a discharge rate determining device 17 may be integrated into the engine controller 15. The fuel pump controller as shown in FIG. 5 is applied to the same vehicle fuel feed system as that shown in FIG. 1, and hence the description of the vehicle fuel feed system will be omitted.

The fuel level monitoring device 14 monitors the level of the fuel in the fuel tank 2 to determine whether or not the jet pump 11 needs to be operated. The discharge rate determining device 17 determines a required discharge rate $Q_P$ at which the fuel pump 2 is to operate on the basis of the output of the fuel level monitoring device 14, the fuel consumption rate $Q_E$ of the engine calculated by the fuel consumption rate calculating device 21 and a jet pump driving flow rate $Q_J$ at which fuel is returned to the jet pump 11 to drive the jet pump 11. The supply power calculating device 18 calculates a magnitude of power to be supplied to the fuel pump 2 to operate the fuel pump 2 at the required discharge rate $Q_P$ determined by the required discharge rate determining device 17, and gives the calculated magnitude of the power to the supply power control device 19. The supply power control device 19 controls the power supply to the fuel pump 2 according to the output of the supply power calculating device 18.

Figure 6:
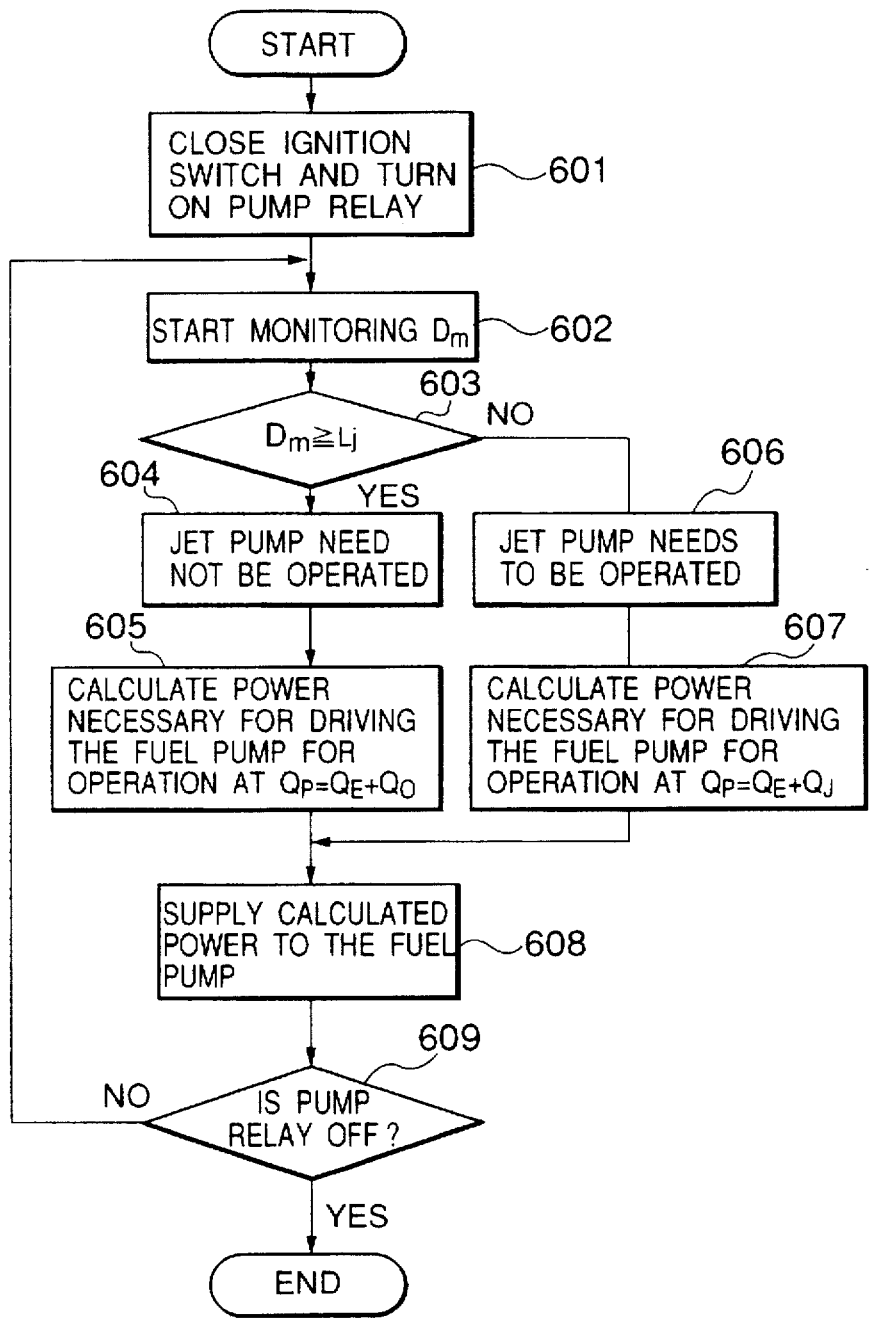
FIG. 6 is a flow chart of a control operation to be carried out by the fuel pump controller of FIG. 5.

Referring to FIG. 6 showing a control operation to be carried out by the fuel pump controller of FIG. 5, if the fuel level monitoring device 14 decides that the jet pump 11 need not be operated, i.e., $D_m \geq L_j$, the necessary power to drive the fuel pump 2 for operation at the required fuel discharge rate $Q_P$ ($\geq Q_E + Q_O$) determined by the discharge rate determining device 17 on the basis of the fuel consumption rate $Q_E$ calculated by the fuel consumption rate calculating device 21 is supplied to the fuel pump 2 (Steps 604 and 605). If the fuel level monitoring device 14 decides that the jet pump 11 needs to be operated, i.e., $D_m < L_j$, the jet pump driving flow rate calculating device 22 calculates a jet pump driving flow rate $Q_J$ necessary to operate the jet pump 11 at a necessary pumping rate $q_j$, the discharge rate determining device 17 determines the required fuel discharge rate $Q_P$ ($\geq Q_E + Q_J$) on the basis of the fuel consumption rate $Q_E$ calculated by the fuel consumption rate calculating device 21 and the jet pump driving flow rate $Q_J$ (Steps 606 and 607). The supply power calculating device 18 calculates a magnitude of the necessary power to drive the fuel pump 2 for operating at the required discharge rate $Q_P$, and then the supply power control device 19 supplies the calculated power to the fuel pump 2 (Step 608).

Figure 7:
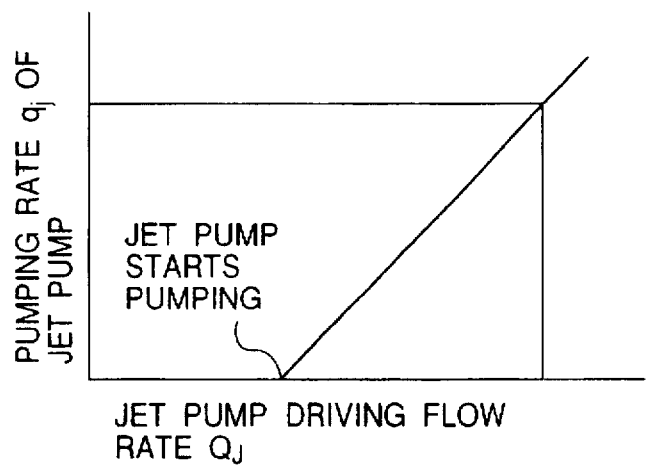
FIG. 7 is a graph showing a relation between a flow rate of fuel pumped by a jet pump and a flow rate of fuel for driving the jet pump.

Thus, when the fuel level monitoring device 14 decides that the jet pump 11 needs to be operated, most of the fuel pumped from the first chamber 1b of the fuel tank 1 by the fuel pump 2 is consumed by the engine and the rest of the fuel is returned to the first chamber 1b. Therefore, fuel will not be left unused in the second chamber 1c of the fuel tank 1 if fuel is sucked from the second chamber 1c of the fuel tank 1 and transferred to the first chamber 1b at a flow rate higher than the fuel consumption rate $Q_E$ of the engine. Therefore, the minimum pumping rate $q_j$ of the jet pump 11 must be equal to the fuel consumption rate $Q_E$ of the engine ($q_j = Q_E$). When the minimum pumping rate $q_j$ is thus determined, the jet pump driving flow rate $Q_J$ necessary to drive the jet pump 11 for operation at the minimum pumping rate $q_j$ can easily be determined from the characteristics of the jet pump 11 shown in FIG. 7.

The required discharge rate $Q_P$ at which the fuel pump 2 is required to operate when the fuel level monitoring device 14 decides that the jet pump 11 needs to be operated does not include the minimum required fuel discharge rate $Q_O$ because the jet pump driving flow rate $Q_J$ is far greater than the minimum required discharge rate $Q_O$, and the minimum required discharge rate $Q_O$ is considered to be included in the jet pump driving flow rate $Q_J$.

The second embodiment reduces the flow rate of the return fuel to the least possible extent when the jet pump 11 need not be operated and limits the flow rate of the return fuel to a minimum necessary value which will not make the fuel left unused in the second chamber 1c of the fuel tank 1 when the jet pump needs to be operated, which further reduces the power consumption and improves the fuel consumption.

The first and the second embodiments of the present invention decide whether or not the jet pump 11 needs to be operated on the basis of the result by comparing the output $D_m$ of the fuel meter unit 13, which is used usually in combination with the fuel tank 1 for measuring the rest of fuel in the fuel tank 1, and the predetermined threshold fuel level $L_j$. However, the decision about the necessity of operation of the jet pump 11 may be made on the basis of the relation between the threshold fuel level $L_j$ and the level of fuel in the fuel tank 1 detected by an additional fuel level detector combined with the fuel tank 1 in addition to the fuel meter unit 13.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A fuel pump controller for controlling a fuel pump in a fuel feed system for a vehicle, provided with a fuel tank having a bottom wall having an upwardly projecting portion dividing an interior space of the fuel tank into a first chamber and a second chamber, an electric fuel pump for pumping fuel from the first chamber into a delivery line, and a jet pump to be operated by return fuel returned through a return line connected to the delivery line into the fuel tank to suck fuel from the second chamber into the first chamber, comprising:

a fuel meter unit for detecting a level of fuel in the fuel tank;

fuel level monitoring means for comparing the level of fuel in the fuel tank with a predetermined threshold fuel level; and power supply control means for controlling a power supply to the fuel pump according to a signal from said fuel level monitoring means.

2. The fuel pump controller according to claim 1, wherein:

said power supply control means controls the power supply to the fuel pump so that a power capable of driving the fuel pump for discharging fuel at a discharge rate equal to a sum of a fuel consumption rate of an engine and a minimum required discharge rate necessary for maintaining an operation of the fuel feed system is supplied to the fuel pump when the fuel level in the fuel tank is not lower than the predetermined threshold fuel level, and controls the power supply to the fuel pump so that a power of a fixed magnitude capable of driving the fuel pump for discharging fuel at a maximum discharge rate is supplied to the fuel pump when the fuel level in the fuel tank is below the predetermined threshold fuel level.

3. The fuel pump controller according to claim 1, wherein:

said power supply control means controls the power supply to the fuel pump so that a power capable of driving the fuel pump for discharging fuel at a discharge rate equal to a sum of a fuel consumption rate of an engine and a minimum required discharge rate necessary for maintaining an operation of the fuel feed system is supplied to the fuel pump when the fuel level in the fuel tank is not lower than the predetermined threshold fuel level, and controls the power supply to the fuel pump so that a power capable of driving the fuel pump for discharging fuel at a discharge rate equal to the sum of the fuel consumption rate of the engine and a jet pump driving flow rate capable of driving the jet pump for sucking fuel from the second chamber into the first chamber at a pumping rate equal to the fuel consumption rate of the engine when the fuel level in the fuel tank is below the predetermined threshold fuel level.

4. The fuel pump controller according to claim 1, wherein:

said power supply control means includes a discharge rate determining device for determining a required fuel discharge rate to be discharged by the fuel pump on the basis of a fuel consumption rate of an engine, a supply power calculating device for calculating a magnitude of power to be supplied to the fuel pump to enable the fuel pump to discharge fuel at the required fuel discharge rate determined by said discharge rate determining device, and a power supply control device for, on the basis of the signal from said fuel level monitoring means, selecting either one of the magnitude of power calculated by said supply power calculating means and a predetermined magnitude of power.

5. The fuel pump controller according to claim 1, wherein:

said power supply control means includes one or more resistors connected in series to a drive circuit of the fuel pump, each having a bypass circuit with a switch to be closed and opened selectively on the basis of the signal from said fuel level monitoring means.

6. The fuel pump controller according to claim 1, wherein:

said power supply control means includes a discharge rate determining device for determining a required fuel discharge rate to be discharged by the fuel pump on the basis of the signal from said fuel level monitoring means and a fuel consumption rate of an engine, a supply power calculating device for calculating a magnitude of power to be supplied to the fuel pump to enable the fuel pump to discharge fuel at the required fuel discharge rate determined by said discharge rate determining means, and a power supply control device foe controlling a power supply to the fuel pump on the basis of the calculated magnitude of power by said supply power calculating means.

7. The fuel pump controller according to claim 1, wherein:

the predetermined threshold fuel level corresponds to a lower limit level of fuel in the fuel tank requiring an operation of the jet pump in order that fuel may not be left unused in the second chamber of the fuel tank.

8. The fuel pump controller according to claim 1, wherein:

said fuel meter unit is a conventional type of meter unit for measuring the rest of fuel in the fuel tank.

* * * * *